US010359502B2

(12) United States Patent
Kitsunezuka

(10) Patent No.: US 10,359,502 B2
(45) Date of Patent: Jul. 23, 2019

(54) RADIO WAVE INTENSITY DISTRIBUTION ASSESSMENT APPARATUS, RADIO WAVE QUALITY DISTRIBUTION ASSESSMENT APPARATUS, RADIO WAVE INTENSITY DISTRIBUTION ASSESSMENT METHOD AND RADIO WAVE QUALITY DISTRIBUTION ASSESSMENT METHOD

(71) Applicant: NEC Corporation, Minato-ku, Tokyo (JP)

(72) Inventor: Masaki Kitsunezuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/544,068

(22) PCT Filed: Feb. 10, 2016

(86) PCT No.: PCT/JP2016/000695
§ 371 (c)(1),
(2) Date: Jul. 17, 2017

(87) PCT Pub. No.: WO2016/129282
PCT Pub. Date: Aug. 18, 2016

(65) Prior Publication Data
US 2018/0011164 A1 Jan. 11, 2018

(30) Foreign Application Priority Data
Feb. 13, 2015 (JP) .................. 2015-026127

(51) Int. Cl.
*G06F 11/00* (2006.01)
*G01S 5/12* (2006.01)
(Continued)

(52) U.S. Cl.
CPC .............. *G01S 5/12* (2013.01); *H04B 17/318* (2015.01); *H04B 17/391* (2015.01);
(Continued)

(58) Field of Classification Search
None
See application file for complete search history.

(56) References Cited

U.S. PATENT DOCUMENTS 9,619,827 B1 * 4/2017 Joneja .................... G06F 9/5011
9,734,817 B1 * 8/2017 Putrycz .................. G10L 13/00
(Continued)

FOREIGN PATENT DOCUMENTS

JP 2006-303788 A 11/2006
JP 2008-241663 A 10/2008
(Continued)

OTHER PUBLICATIONS

Ministry of Internal Affairs and Communications, "Ministry of Internal Affairs and Communications: The Radio Use Web Site", [online] (Retrieved on Dec. 12, 2014), Internet <URL: http://www.tele.soumu.go.jp/e/index_htm>, whole document Cited in the Specification.
(Continued)

*Primary Examiner* — Phirin Sam

(57) ABSTRACT

A method is presented of assessing a radio wave intensity distribution covering areas and frequencies, and assessing the quality of a communication function provided by a radio wave. An apparatus is presented including a radio wave station position detection unit that detects a position of a radio wave station on the basis of a geographic image having position information and of an image of the radio wave station; a radio wave station information integration unit that outputs radio wave station information based on the position of the radio wave station and radio wave station license information on the radio wave station; and a radio wave intensity distribution estimation unit that estimates and outputs a radio wave intensity distribution within a designated range on the basis of the radio wave
(Continued)

station information and geographic information on the surroundings of the radio wave station.

10 Claims, 8 Drawing Sheets

(51) Int. Cl.
| | | |
|---|---|---|
| H04H 20/12 | (2008.01) | |
| H04W 16/22 | (2009.01) | |
| H04B 17/391 | (2015.01) | |
| H04H 60/50 | (2008.01) | |
| H04B 17/318 | (2015.01) | |
| H04B 17/26 | (2015.01) | |

(52) U.S. Cl.
CPC ............ *H04H 20/12* (2013.01); *H04H 60/50* (2013.01); *H04W 16/22* (2013.01); *H04B 17/26* (2015.01)

(56) References Cited

U.S. PATENT DOCUMENTS

| | | | | |
|---|---|---|---|---|
| 2007/0232345 A1* | 10/2007 | Taoka | ...................... | H04W 4/02 455/522 |
| 2009/0076788 A1 | 3/2009 | Sugahara | | |
| 2009/0201149 A1* | 8/2009 | Kaji | ........................ | G01C 21/20 340/539.13 |
| 2010/0284293 A1* | 11/2010 | Watanabe | ........... | H04L 41/5003 370/252 |
| 2013/0314268 A1* | 11/2013 | Fukuda | ............... | G01S 13/0209 342/21 |
| 2014/0207871 A1* | 7/2014 | Miloushev | ............ | G06F 9/5016 709/205 |
| 2015/0052441 A1* | 2/2015 | Degioanni | .......... | G06F 11/3495 715/734 |
| 2015/0111598 A1* | 4/2015 | Azami | ................... | H04W 64/00 455/456.1 |
| 2015/0288571 A1* | 10/2015 | Baughman | ............ | H04L 41/145 703/21 |
| 2017/0161819 A1* | 6/2017 | Strashek | ............. | G06Q 30/0601 |

FOREIGN PATENT DOCUMENTS

| | | |
|---|---|---|
| JP | 2009-115457 A | 5/2009 |
| JP | 2009-194812 A | 8/2009 |
| JP | 2014-060687 A | 4/2014 |

OTHER PUBLICATIONS

The Association for Promotion of Digital Broadcasting, "[Dpa] Rough Estimation of Broadcasting Area", [online] (Retrieved on Dec. 12, 2014), Internet <URL: http://apab-tv-area.jp/>, whole document Cited in the Specification.

NTT DOCOMO, "Service area / Area / NTT DOCOMO", [online] (Retrieved on Dec. 12, 2014), Internet <URL: https://www.nttdocomo.co.jp/support/area/>, whole document Cited in the Specification.

KDDI, "Area / Mobile phones—Smartphones / au", [online] (Retrieved on Dec. 12, 2014), Internet <URL: http://www.au.kddi.com/mobile/area/>, whole document Cited in the Specification.

SoftBank, "Networks—Area / Mobile / SoftBank", [online] (Retrieved on Dec. 12, 2014), Internet <URL: http://www.softbank.jp/mobile/network/>, whole document Cited in the Specification.

International Search Report for PCT Application No. PCT/JP2016/000695, mailed dated May 10, 2016.

English translation of Written opinion for PCT Application No. PCT/JP2016/000695.

\* cited by examiner

RADIO WAVE INTENSITY DISTRIBUTION ASSESSMENT APPARATUS, RADIO WAVE QUALITY DISTRIBUTION ASSESSMENT APPARATUS, RADIO WAVE INTENSITY DISTRIBUTION ASSESSMENT METHOD AND RADIO WAVE QUALITY DISTRIBUTION ASSESSMENT METHOD

This application is a National Stage Entry of PCT/JP2016/000695 filed on Feb. 10, 2016, which claims priority from Japanese Patent Application 2015-026127 filed on Feb. 13, 2015, the contents of all of which are incorporated herein by reference, in their entirety.

TECHNICAL FIELD

The present invention relates to an apparatus for assessing spatial and temporal distribution of intensity and quality of radio waves used in communications, broadcasting, radars and the like, and also to a method for the same.

BACKGROUND ART

Radio waves, particularly those of 30 MHz to 3 GHz in the VHF (Very High Frequency) and UHF (Ultra High Frequency) bands used for television broadcasting and mobile communications, function as a social infrastructure indispensable to daily life, and they may be said to be public property from a social point of view. The government, its related agencies and wireless carriers are required to publicize as much information on radio waves as possible so that radio wave users can monitor whether the radio waves are fairly used or not. As public information currently available for users, there are a frequency assignment situation and radio station license information (Non-Patent Literature (NPL) 1), a terrestrial digital broadcasting area map (NPL 2), a cellular phone area map (NPL 3, NPL 4 and NPL 5) and the like.

Patent Literature 1 (PTL 1) discloses a system and a method for creating a distribution map of radio wave intensity by using a positioning function and an electric field strength measurement function of a cellular phone. When a radio wave intensity distribution is known, availability of a radio wave can be assessed on the basis of the distribution. PTL 2 discloses a method which acquires a radio wave intensity distribution by using radio wave intensities acquired at a plurality of discrete observation points by calculation or measurement. In PTL 3, a blind zone building to which no radio wave can reach is extracted from radio wave environment data and geographic data including information about buildings. Then, from data on the usage state of a radio communication system of concern and the geographic data, a calculation formula for estimating the profitability of communications is acquired. On the basis of information on the extracted blind zone building and the acquired calculation formula, a method disclosed in PTL 3 further estimates profitability improvement effects to be achieved by implementing blind zone measures on the blind zone building and, according to the amounts of the improvement effects, performs prioritization of the blind zone measures.

CITATION LIST

Patent Literature

[PTL 1] Japanese Patent Laid-Open No. JP 2008-241663
[PTL 2] Japanese Patent Laid-Open No. JP 2009-115457
[PTL 3] Japanese Patent Laid-Open No. JP 2006-303788

Non Patent Literature

[NPL 1] Ministry of Internal Affairs and Communications, "Ministry of Internal Affairs and Communications: The Radio Use Web Site", [online], [Retrieved on Dec. 12, 2014], Internet <URL: http://www.tele.soumu.go.jp/index.htm>
[NPL 2] The Association for Promotion of Digital Broadcasting, "[Dpa] Rough Estimation of Broadcasting Area" [online], [Retrieved on Dec. 12, 2014], Internet <URL: http://dpa-tv-area.jp/>
[NPL 3] NTT DOCOMO, "Service area I Area I NTT DOCOMO," [online], [Retrieved on Dec. 12, 2014], Internet <https://www.nttdocomo.co.jp/support/area/>
[NPL 4] KDDI, "Area|Mobile phones•Smartphones|au," [online], [Retrieved on Dec. 12, 2014], Internet <http://www.au.kddi.com/mobile/area/>
[NPL 5] SoftBank, "Networks•Area|Mobile|SoftBank," [online], [Retrieved on Dec. 12, 2014], Internet <http://www.softbank.jp/mobile/network/>

SUMMARY OF INVENTION

Technical Problem

However, the methods of PTL 1 to PTL 3 have problems described below.

In the method of PTL 1 which uses a positioning function and an electric field strength measurement function of a cellular phone, it is difficult to practically secure a sufficient number of observation points because the number of users using an application having such functions is limited. Therefore, the method has very low feasibility in creation of a radio wave intensity distribution map covering a wide range. Furthermore, even if an application having such functions becomes widely spread, it still is impossible to create a radio wave intensity distribution map for other frequency bands than those of cellular phones.

Also in the methods of PTL 2 and PTL 3, creation of a radio wave intensity distribution map covering a wide range is difficult, because the methods acquire a radio wave intensity distribution by radio wave intensity measurements at a limited number of observation points within an area subjected to the investigation or by calculation based on position information on a base station.

On the other hand, various area maps disclosed in NPL 1 to NPL 5 are those indicating whether a radio wave is available or not in a binary way, but none of them discloses any spatial distribution of radio wave intensity which is an analog quantity. Further, in the area maps for cellular phones disclosed in NPL 3 to NPL 5, a highest communication speed in the corresponding area is disclosed, but no spatial distribution of radio wave intensity is disclosed. Therefore, those area maps do not enable users to know a radio wave intensity distribution covering a wide range of area and frequency, and it accordingly is impossible for the users to assess availability of a radio wave on the basis of the area maps.

The present invention has been made in view of the above-described problems, and its objective is to enable assessment of a radio wave intensity distribution widely covering areas and frequencies, and thereby to enable assessment of a distribution, widely covering areas and frequencies, of the quality of a communication function provided by a radio wave.

Solution to Problem

A radio wave intensity distribution assessment apparatus of the present invention comprises: a radio wave station position detection unit for detecting a position of the radio wave station, on the basis of a geographic image having position information and of an image of a radio wave station; a radio wave station information integration unit for outputting radio wave station information based on the position of the radio wave station and on radio wave station license information on the radio wave station; and a radio wave intensity distribution estimation unit for estimating and outputting a radio wave intensity distribution in a designated range, on the basis of the radio wave station information and topographical information on the surroundings of the radio wave station.

A radio wave quality distribution assessment apparatus of the present invention comprises: a radio wave intensity distribution assessment unit including the radio wave intensity distribution assessment apparatus according to the present invention; a highest quality distribution estimation unit for estimating and outputting a distribution of highest quality obtained when using a radio wave exclusively, on the basis of the radio wave intensity distribution and wireless standard information on the radio wave; a use number distribution estimation unit for estimating a distribution of the number of simultaneous uses of the radio wave, on the basis of statistical information; and an effective quality distribution estimation unit for estimating and outputting a distribution of effective quality provided for users of the radio wave, on the basis of the distribution of highest quality and the distribution of the number of simultaneous uses.

A radio wave intensity distribution assessment method of the present invention comprises: detecting a position of the radio wave station, on the basis of a geographic image having position information and of an image of a radio wave station; outputting radio wave station information based on the position of the radio wave station and on radio wave station license information on the radio wave station; and estimating and outputting a radio wave intensity distribution in a designated range, on the basis of the radio wave station information and topographical information on the surroundings of the radio wave station.

A radio wave quality distribution assessment method of the present invention comprises: estimating a radio wave intensity distribution by the radio wave intensity distribution assessment method according to the present invention; estimating a distribution of highest quality obtained when using a radio wave exclusively, on the basis of the radio wave intensity distribution and wireless standard information on the radio wave; estimating a distribution of the number of simultaneous uses of the radio wave, on the basis of statistical information; and estimating a distribution of effective quality provided for users of the radio wave, on the basis of the distribution of highest quality and the distribution of the number of simultaneous uses.

Advantageous Effects of Invention

According to the present invention, assessment of a radio wave intensity distribution widely covering areas and frequencies becomes possible, and it thereby becomes possible to assess a distribution, widely covering areas and frequencies, of the quality of a communication function provided by a radio wave.

DESCRIPTION OF EMBODIMENTS

Hereinafter, example embodiments of the present invention will be described in detail, with reference to drawings. While technically preferable limitations will be made in the example embodiments described below, they are not intended to limit the range of the present invention to that described below.

(First Example Embodiment)

Figure 1:
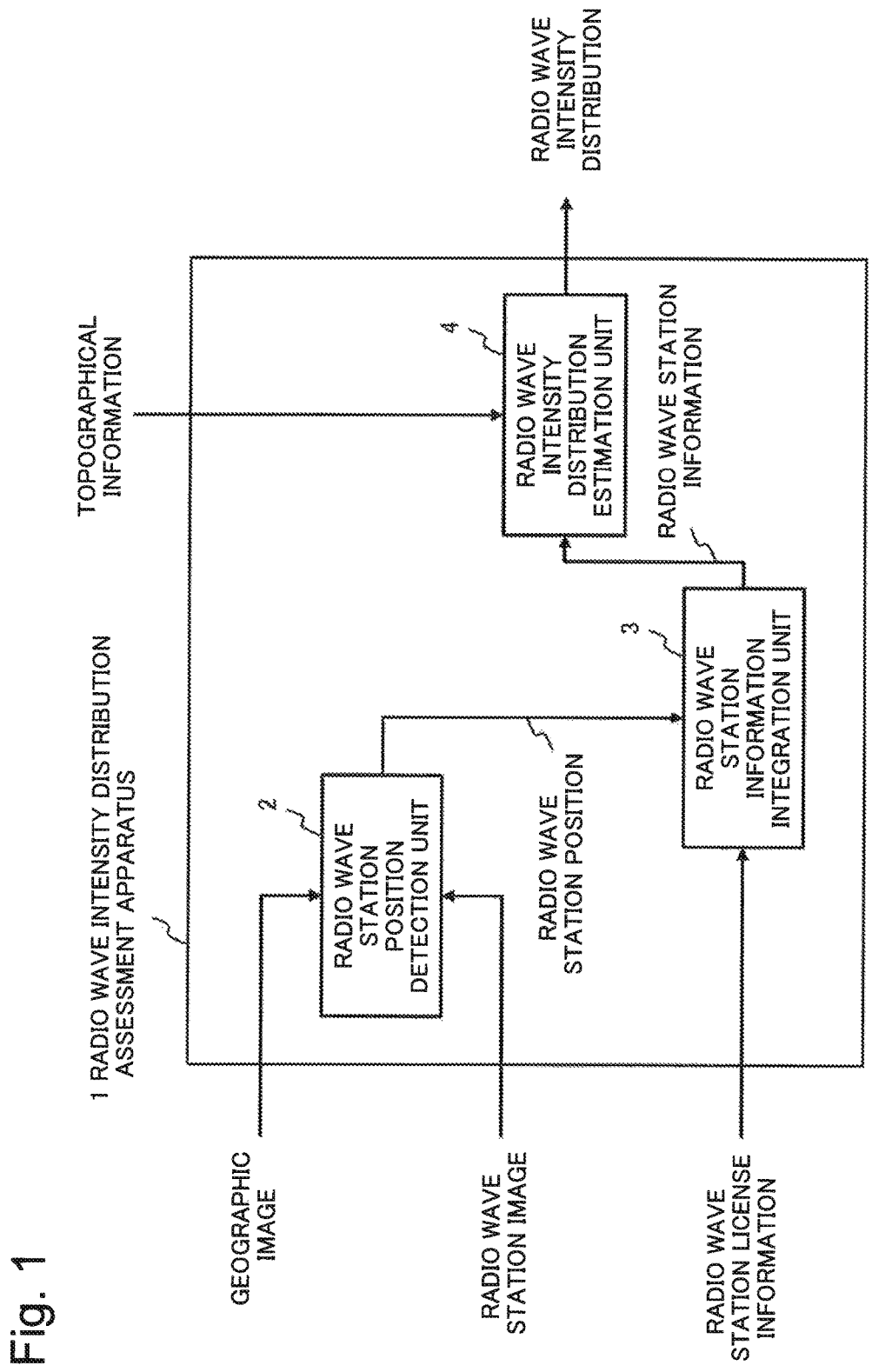
FIG. 1 is a block diagram showing a configuration of a radio wave intensity distribution assessment apparatus of a first example embodiment of the present invention.

FIG. 1 is a block diagram showing a configuration of a radio wave intensity distribution assessment apparatus of a first example embodiment of the present invention. The radio wave intensity distribution assessment apparatus 1 of the present example embodiment includes a radio wave station position detection unit 2 which detects a position of a radio wave station on the basis of a geographic image having position information and an image of the radio wave station. It also includes a radio wave station information integration unit 3 which outputs radio wave station information based on the position of the radio wave station and radio wave station license information on the radio wave station. It further includes a radio wave intensity distribution estimation unit 4 which estimates and outputs a radio wave intensity distribution in a designated range, on the basis of the radio wave station information and topographical information on surroundings of the radio wave station. Here, the directions of arrows in FIG. 1 are illustrated as merely an example but not as the ones limiting the directions of signals between the blocks.

According to the present example embodiment, it becomes possible to acquire a radio wave intensity distribution widely covering areas and frequencies, on the basis of information about a radio wave of a radio wave station and topographical information on surroundings of the radio wave station.

Thus, according to the present example embodiment, assessment of a radio wave intensity distribution widely covering areas and frequencies becomes possible, and it thereby becomes possible to assess a distribution, widely covering areas and frequencies, of the quality of a communication function provided by a radio wave.

(Second Example Embodiment)

Figure 2:
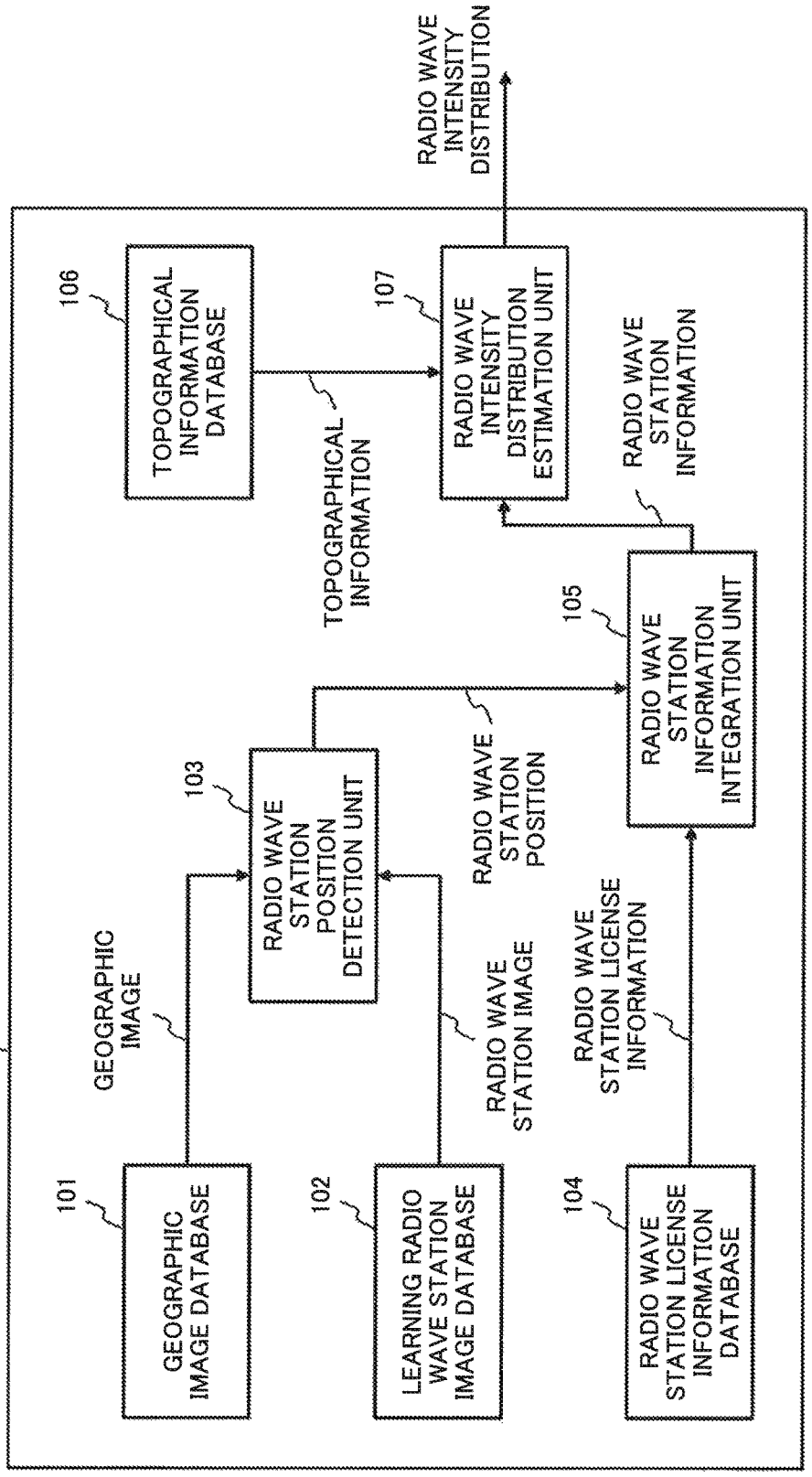
FIG. 2 is a block diagram showing a configuration of a radio wave intensity distribution assessment apparatus of a second example embodiment of the present invention.

FIG. 2 is a block diagram showing a configuration of a radio wave intensity distribution assessment apparatus of a second example embodiment of the present invention. The radio wave intensity distribution assessment apparatus 10 of the present example embodiment includes a geographic image database 101, a learning radio wave station image database 102, a radio wave station position detection unit 103, a radio wave station license information database 104, a radio wave station information integration unit 105, a topographical information database 106 and a radio wave intensity distribution estimation unit 107. Here, the directions of arrows in FIG. 2 are illustrated as merely an example but not as the ones limiting the directions of signals between the blocks.

Figure 3:
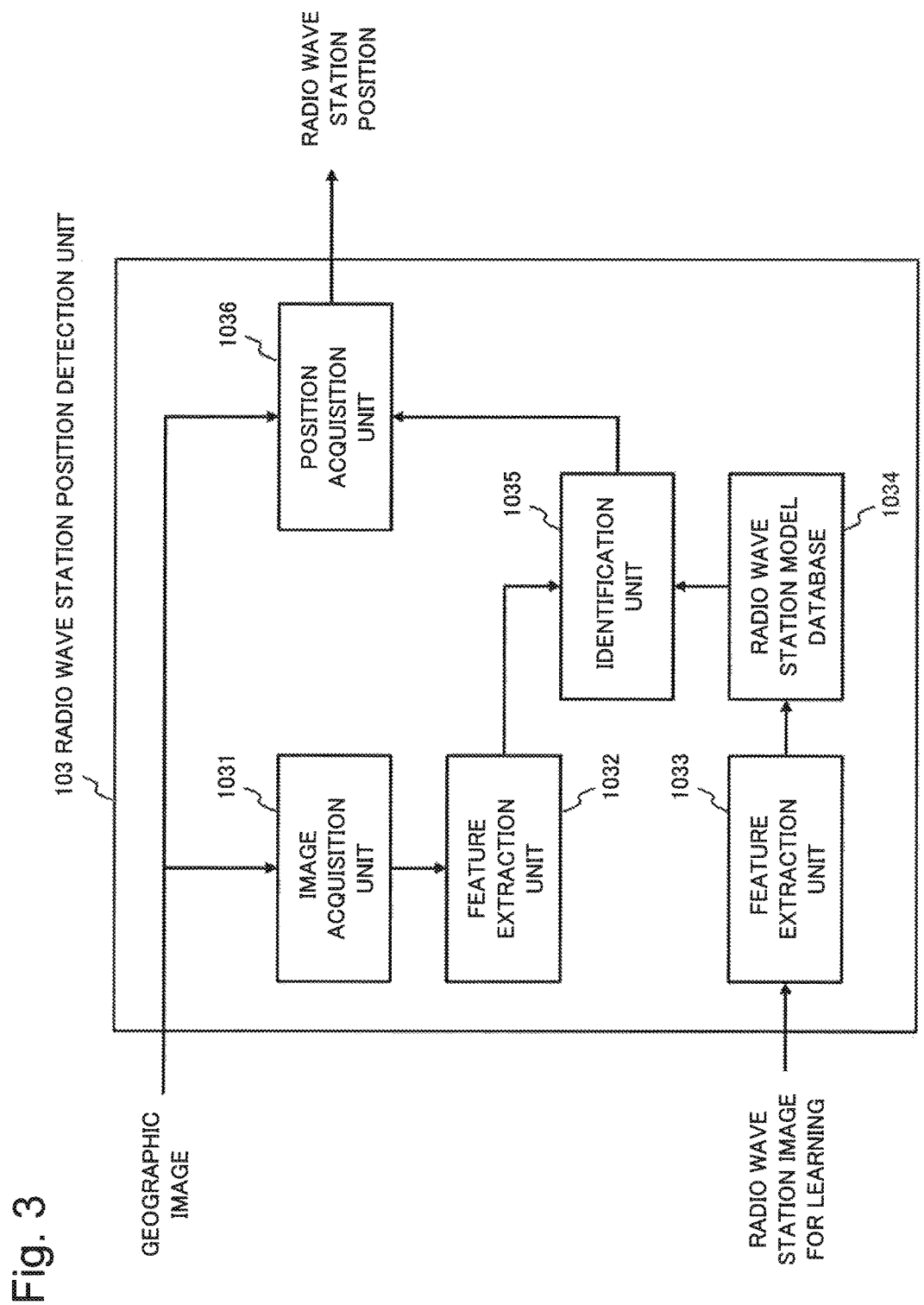
FIG. 3 is a block diagram showing a configuration of a radio wave station position detection unit of the second example embodiment of the present invention.

FIG. 3 is a block diagram showing a configuration of the radio wave station position detection unit 103. The radio wave station position detection unit 103 includes an image acquisition unit 1031, a feature extraction unit 1032, a feature extraction unit 1033, a radio wave station model database 1034, an identification unit 1035 and a position acquisition unit 1036. Here, the directions of arrows in FIG. 3 are illustrated as merely an example but not as the ones limiting the directions of signals between the blocks.

For the radio wave intensity distribution assessment apparatus 10, an information processing device such as a server device may be used. The configuration of the radio wave intensity distribution assessment apparatus 10 may be implemented by using computation resources of a CPU (Central Processing Unit) of the server device and storage resources of such as a memory and an HDD (Hard Disk Drive) and thereby causing a program to run on the CPU.

For example, the units constituting the radio wave intensity distribution assessment apparatus 10 may be implemented by the computation resources of the CPU, and the databases by the storage resources of such as a memory and an HDD. The radio wave intensity distribution assessment apparatus 10 may further include a keyboard, a mouse or a touch panel to be an input unit for inputting data, a display device to be a display unit for displaying an assessment result and the like, and other components.

Details of the present example embodiment will be described with reference to FIGS. 2 and 3.

The geographic image database 101 holds geographic image data which is obtained by adding position information further to a publicly accessible geographic image capturing a designated area from a space. For example, the geographic image data is image data open to the public on the Internet or the like which was captured by a vehicle or artificial satellite provided with a camera and then correlated with information on the capture position. Many of radio wave stations for broadcasting, typified by the Tokyo Skytree and the Tokyo Tower, have a height of 10 meters or larger so as to cover a wide area, so that their positions can be identified even from image data captured by an artificial satellite. Further, the position of a cellular phone network base station installed outdoors can be identified from an image collected by a capture vehicle.

The learning radio wave station image database 102 holds radio wave station image information data for learning which is prepared in advance. Such image information can be acquired by collecting from the Internet or the geographic image database 101 an image publicized as a radio wave station image, by using image search. In addition to "radio wave station", keywords to be used for the search include "base station", "wireless station", "transmission station", "broadcasting station", "relay station", "radio wave tower", "television tower", "radio tower", "antenna" and the like.

Further, keywords to narrow down radio wave station image information by radio wave class include those representing frequencies such as "UHF", "VHF", "800 MHz band", "2 GHz band", "platinum band" and "channel 27", those representing transmission output power such as "high output power", "medium output power", "10 kW" and "10 W", and the like. Keywords to narrow down by radio wave usage include "cellular phone", "cellular", "terrestrial digital broadcasting", "television", "FM" (Frequency Modulation), "AM" (Amplitude Modulation), "disaster prevention", "railway" and the like.

It is desirable to include a step of a human's recognizing an image capturing a desired radio wave station, from among a group of images obtained by the search. Thereby, accuracy of the learning can be increased. It is also desirable to hold a radio wave station image in a manner to tag it with attributes such as frequency band, output power and usage. Thereby, it becomes possible to perform the learning in advance using such tagged radio wave station images and accordingly to perform, on an unidentified radio wave station image, identification and classification of attributes of the radio wave station.

Next, operation of the radio wave station position detection unit 103 will be described with reference to FIG. 3. From the geographic image database 101, the image acquisition unit 1031 exhaustively acquires images capturing areas within a desired range, in a manner to divide them into processsable amounts. The feature extraction unit 1032 and the feature extraction unit 1033 each extract a robust feature invariable with rotation, scale change and illuminance change of an image, from geographic image data and radio wave station image data provided to them. The radio wave station model database 1034 holds various radio wave station feature models which the feature extraction unit 1033 has extracted from images held by the learning radio wave station image database 102.

The identification unit 1035 compares a feature outputted by the feature extraction unit 1032 with features held by the radio wave station model database 1034, and thereby identifies whether a radio wave station is included in a geographic image acquired by the image acquisition unit 1031. When the identification unit 1035 has identified that a radio wave station is included in the geographic image, the position acquisition unit 1036 acquires information on a position where the image was captured, and estimates and outputs a position of the radio wave station.

In the operation described above, what is called general object recognition technology is used. As a feature extraction method used by the feature extraction units 1032 and 1033, the SIFT (Scale-Invariant Feature Transform) method and the SURF (Speed Up Robust Features) method are applicable.

Here, a feature of an image determined to be a radio wave station image by the identification unit 1035 may be additionally taken into the radio wave station model database. In that case, whether or not the image is that correctly capturing a desired radio station may be determined by human eyes, in order to increase accuracy of the learning. By doing that way, there is achieved an effect that the radio wave station model database is expanded and, accordingly, the identification accuracy improves with progress of the learning.

The above description has been given of the operation of estimating and outputting an installation position of a radio wave station. There, when images held by the learning radio wave station image database 102 are tagged with attributes such as frequency band, transmission output and usage, it is also possible to construct a radio wave station model database in terms of each of the attributes. As a result, it becomes possible for the identification unit 1035 to identify not only whether or not to be a radio wave station but also, when a radio wave station has been identified, what attribute the radio wave station has. As a typical method for performing such identification, an evolutionary algorithm mimicking the organic evolution, an algorithm mimicking a structure and a function of a neural network of an organism, a method using a support vector machine, and the like are applicable.

The radio wave station license information database 104 holds license information data on a radio wave station registered at the time of the radio wave station's opening. For example, using a site of Ministry of Internal Affairs and Communications for searching information on radio wave stations or the like, for a radio wave station, it is possible to refer to the licensee name, radio wave station class, purpose, approximate facility installation position, radio wave class, frequency, aerial power and the like. However, information on wireless stations concerning national security and diplomacy, those for disaster countermeasures similarly classified to the former ones and those concerning crime prevention and control is not disclosed, because of anxiety about posing a trouble to national security, diplomacy, crime prevention and to inspection and control by administrative agencies. Wireless stations corresponding to such ones are radio wave stations for national defense, foreign affairs administration, fire fighting and prevention, police, prosecution, maritime safety and the like.

In that respect, a document such as "Japanese Radio Frequency Dictionary" (Sansai Books Co., Ltd.) may be referred to. Such a document contains even information on used frequency bands which is not disclosed at the site of Ministry of Internal Affairs and Communications. In addition, using Internet search, it is possible to acquire information on a frequency band and modulation method of a usage for which no information is available at the site of Ministry of Internal Affairs and Communications.

The radio wave station information integration unit 105 identifies a radio wave station whose position has been detected by the radio wave station position detection unit 103, with reference to the license information held by the radio wave station license information database 104. It further integrates a detail position and license information for the radio wave station, and thereby outputs the radio wave station's information which is to be required for estimating radio wave intensity distribution. For example, when a detected position of a radio wave station corresponds to a station building, the radio wave station is estimated to be a facility relevant to railway radio used by a railway company possessing the station building. By searching the radio wave station license information database 104 using the above-mentioned information, it is possible to narrow down a frequency band and transmission power used by the radio wave station.

Further, in the radio wave station identification, a notice of the radio wave station facility, the antenna size, shape and the like may be referred to, in addition to the position detected by the radio wave station position detection unit 103. For example, in some cases, a carrier name is revealed on a notice of a radio wave station facility. Further, from the antenna size and shape, a class and usage of the radio wave may be estimated. For example, a sector antenna is often used for a cellular phone base station, generally.

For radio wave stations such as described below, only an approximate frequency band is disclosed, because of anxiety about inducing jamming or the like and thereby posing trouble to activities closely connected with securing of people's life and safety and public safety, and to information gathering activities. Further, frequencies lower than 1 GHz are revealed with 100 MHz resolution. Such radio wave stations include those for such as railway, electricity and gas services, which are wireless stations closely connected with securing of people's life and safety or public safety, and those for such as newspaper transmission and broadcasting services, which are wireless stations aimed at information gathering or the like.

It has been described above that reference is made to a position outputted by the radio wave station position detection unit 103, but when the radio wave station position is open to the public and thus already known, reference may be made to it. For example, in many cases, an address is disclosed for a radio wave station even said to be a landmark, such as the Tokyo Skytree.

The topographical information database 106 holds topographical information data which is to be required for simulating radio wave propagation within a designated space. For example, high-resolution digital topographical data acquired by a space shuttle mission (Shuttle Radar Topography Mission: SRTM) of the US National Aeronautics and Space Administration is open to the public and may be used for the simulation. The SRTM data is publicized as a detail version with one arc-second (about 30 meters) mesh, referred to as SRTM-1, and as another one with three arc-second (about 90 meters) mesh, referred to as SRTM-3.

When precisely estimating a radio wave intensity distribution within a narrower range, it is preferable to hold more precise geographic data including positions and heights of buildings. It is desirable to include information on such as topography, geological features, and structures and materials of the buildings. Further, when assessing a radio wave intensity distribution inside a building, it is preferable to hold also information on the number of floors, room arrangement, and thicknesses and materials of walls and floors. Such information can be acquired by using real estate and housing information sites. In addition, the conductivity and relative dielectric constant of the ground, and the refractive index of the air may be included. These values are used when performing simulation of radio wave propagation with high accuracy.

The radio wave intensity distribution estimation unit 107 estimates and outputs a radio wave intensity distribution within a designated space, on the basis of the radio wave station information including information on a radio wave of a radio wave station outputted by the radio wave station information integration unit 105 and the topographical information held by the topographical information database 106. As a method for estimating a radio wave intensity distribution, the Okumura-Hata model, which models loss due to spatial propagation according to surrounding environments such as an "urban area" and a "suburb area", may be used. As an alternative model taking into account influence of irregular topography on radio waves of VHF and UHF bands, the Longley-Rice model may be used.

As a method with higher accuracy, the ray tracing method, which regards a radio wave as a light ray and traces a locus of the light ray from the transmission point to the reception point taking into account reflection, transmission and diffraction, may be used. By the ray tracing method, for example, it is possible to assess how a radio wave from a cellular phone base station outside a building propagates within the building and with what intensity the radio wave is distributed there.

While the above description has been given mainly of a radio wave system for communications and broadcasting, it is also possible to assess intensity distribution of a radio wave used by a radar system such as an airport surveillance radar and a weather radar.

By the radio wave intensity distribution assessment apparatus 10 described above, it is possible to assess and provide a radio wave intensity distribution widely covering areas and frequencies on the basis of public information. For example, it is possible for a user to know a radio wave of what frequency is distributed with what intensity in the area and the building the user lives or intends to live, and accordingly to assess the availability objectively. Further, the radio wave intensity distribution thus provided enables assessment of distribution of the quality of a communication function provided by the radio wave.

As has been described above, according to the present example embodiment, assessment of a radio wave intensity distribution widely covering areas and frequencies becomes possible, and it thereby becomes possible to assess a distribution, widely covering areas and frequencies, of the quality of a communication function provided by the radio wave.

(Third Example Embodiment)

Figure 4:
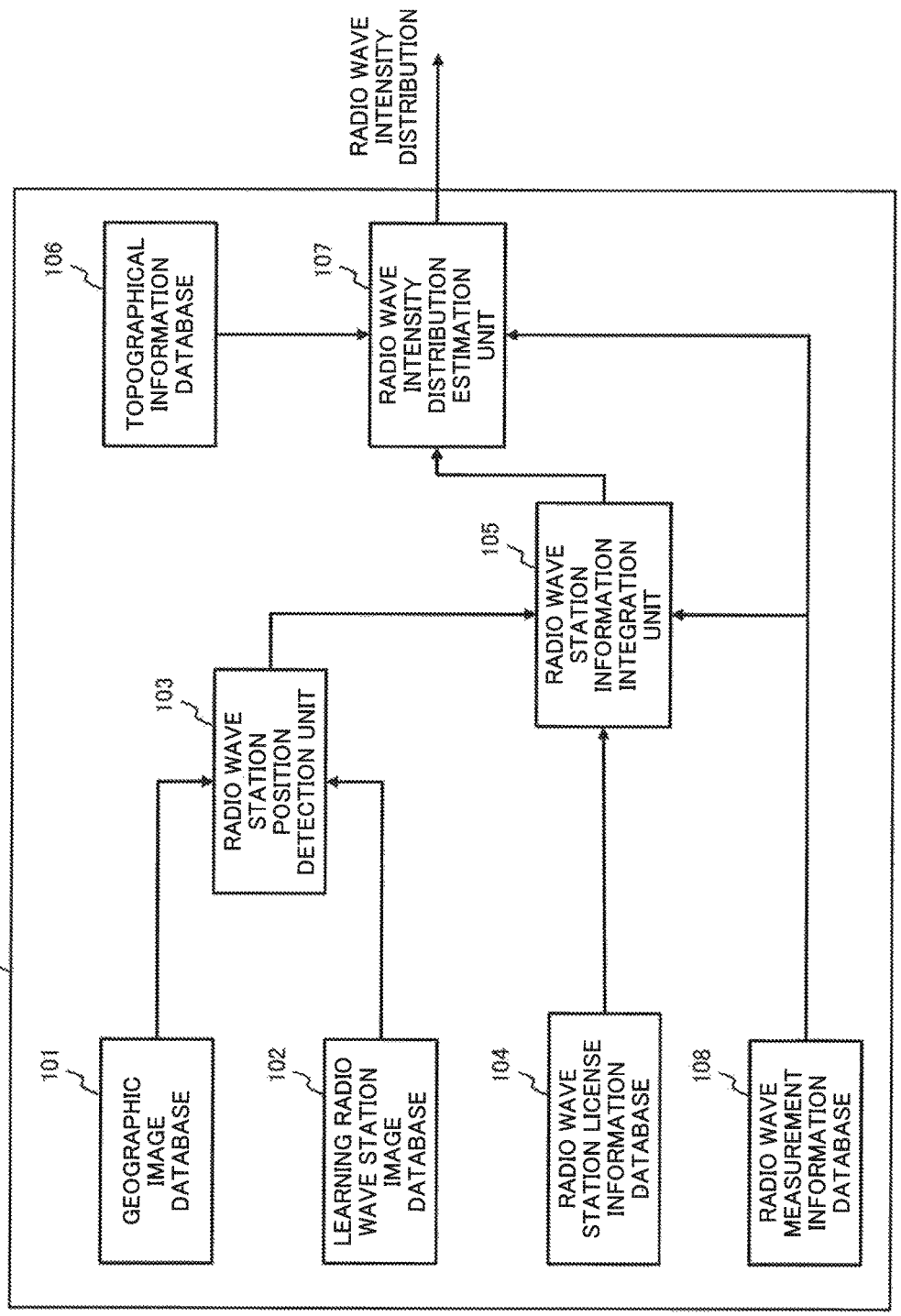
FIG. 4 is a block diagram showing a configuration of a radio wave intensity distribution assessment apparatus of a third example embodiment of the present invention.

FIG. 4 is a block diagram showing a configuration of a radio wave intensity distribution assessment apparatus of a third example embodiment of the present invention. The radio wave intensity distribution assessment apparatus 11 of the present example embodiment further includes a radio wave measurement information database 108, in addition to the radio wave intensity distribution assessment apparatus 10 of the second example embodiment. Here, the directions of arrows in FIG. 4 are illustrated as merely an example but not as the ones limiting the directions of signals between the blocks.

The radio wave measurement information database 108 holds data obtained by actually performing radio wave intensity measurement using a spectrum analyzer or the like. The measurement data includes information on the position at which the measurement was performed, the radio wave frequency and the radio wave intensity. The information held by the radio wave measurement information database 108 is additionally used when the radio wave station information integration unit 105 refers to information held by the radio wave station license information database 104. Specifically, by estimating, from data on a radio wave frequency and intensity measured in the vicinity of a radio wave station position detected by the radio wave station position detection unit 103, the frequency and intensity of a radio wave transmitted from the radio wave station, it is possible to simplify a process of narrowing down license information on the radio wave station from the radio wave station license information database 104.

It is because, for example, with respect to a base station held by a mobile communication carrier such as of cellular phone and PHS (Personal Handy-phone System), the frequency and power of a radio wave transmitted by the base station is disclosed in detail and, accordingly, a carrier holding the radio station can be deduced by referring to the radio wave measurement information. Further, according to the radio wave measurement information, even in a case of a radio wave station such as for railway, electricity or gas service where only an approximate frequency is disclosed, it is possible to deduce a detail frequency used for the service.

Here, the information held by the radio wave measurement information database 108 may be used by not only the radio wave station information integration unit 105 but also the radio wave intensity distribution estimation unit 107. By using an actually measured value of radio wave intensity at each point for the radio wave intensity estimation, a radio wave intensity can be estimated to be closer to its actual value.

Further, the radio wave intensity measurement may be performed by means of other than a spectrum analyzer. For example, in a case of a frequency band used for a cellular telephone network, the radio wave intensity measurement can be performed using a cellular phone (including a smartphone). In a case of a frequency band used for terrestrial digital television broadcasting, the radio wave intensity measurement can be performed using a TV tuner. Further, a low-price simple spectrum analyzer which can be used by being connected to a general-purpose computer may also be used.

Position information can be acquired by receiving GPS (Global Positioning System) signals. Further, by receiving signals from a Wi-Fi (Wireless Fidelity) (registered trademark) access point and a cellular base station, in addition to GPS signals, the positional accuracy can be improved.

Furthermore, by performing detection of radio wave arrival direction in addition to the radio wave intensity measurement, it is possible to estimate a position of a radio station and a frequency and power of a radio wave transmitted by the radio wave station with higher accuracy. As a method for performing the detection of radio wave arrival direction, a method using a directional antenna, such as a Yagi Antenna, parabolic antenna and array antenna, is applicable. As a high angular resolution algorithm using an array antenna, the MUSIC (Multiple Signal Classification) method and the ESPRIT (Estimation of Signal Parameters via Rotation Invariance Techniques) method are applicable.

Thus, according to the radio wave intensity distribution assessment apparatus 11 of the present example embodiment, because actually measured radio wave intensity data can be further referred to, it is possible to assess and provide a radio wave intensity distribution widely covering areas and frequencies and having higher accuracy.

As has been described above, according to the present example embodiment, assessment of a radio wave intensity distribution widely covering areas and frequencies becomes possible, and it thereby becomes possible to assess a distribution, widely covering areas and frequencies, of the quality of a communication function provided by a radio wave.

(Fourth Example Embodiment)

Figure 5:
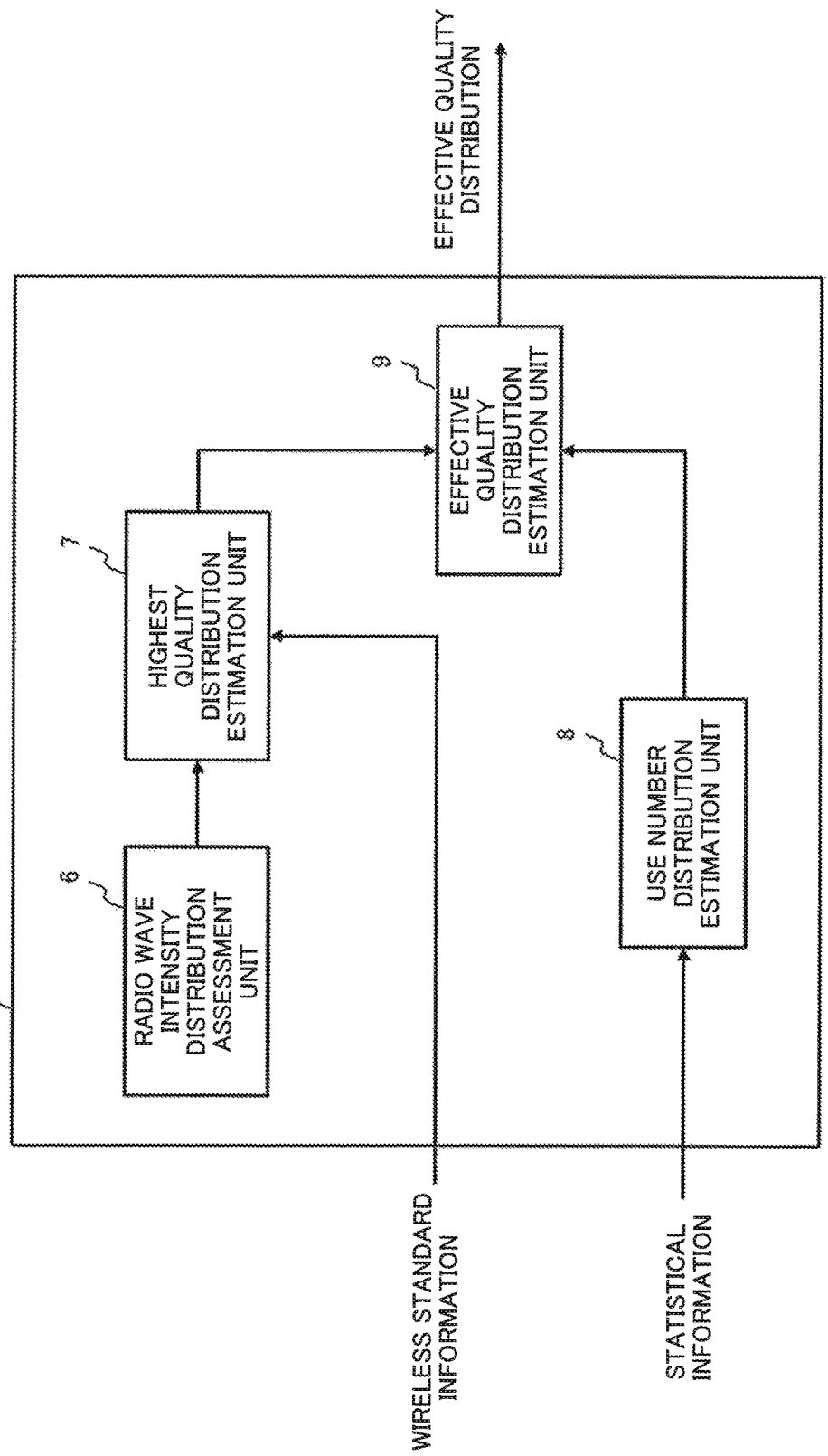
FIG. 5 is a block diagram showing a configuration of a radio wave quality distribution assessment apparatus of a fourth example embodiment of the present invention.

FIG. 5 is a block diagram showing a configuration of a radio wave quality distribution assessment apparatus of a fourth example embodiment of the present invention. The radio wave quality distribution assessment apparatus 5 of the present example embodiment includes a radio wave intensity distribution assessment unit 6 which estimates and outputs a radio wave intensity distribution, and includes also a highest quality distribution estimation unit 7 which, on the basis of the radio wave intensity distribution and wireless standard information on a radio wave, estimates and outputs a distribution of the highest quality obtained when using the radio wave exclusively. It further includes a use number distribution estimation unit 8 which estimates a distribution of the number of simultaneous uses of the radio wave on the basis of statistical information, and includes also an effective quality distribution estimation unit 9 which, on the basis of the distribution of the highest quality and the distribution of the number of simultaneous uses, estimates and outputs a distribution of effective quality provided for users of the radio wave. Further, the radio wave intensity distribution assessment unit 6 includes a radio wave intensity distribution assessment apparatus according to the first, second or third example embodiment of the present invention. Here, the directions of arrows in FIG. 5 are illustrated as merely an example but not as the ones limiting the directions of signals between the blocks.

According to the present example embodiment, assessment of a radio wave intensity distribution widely covering areas and frequencies becomes possible, and it thereby becomes possible to assess a distribution, widely covering areas and frequencies, of the quality of a communication function provided by a radio wave.

(Fifth Example Embodiment)

Figure 6:
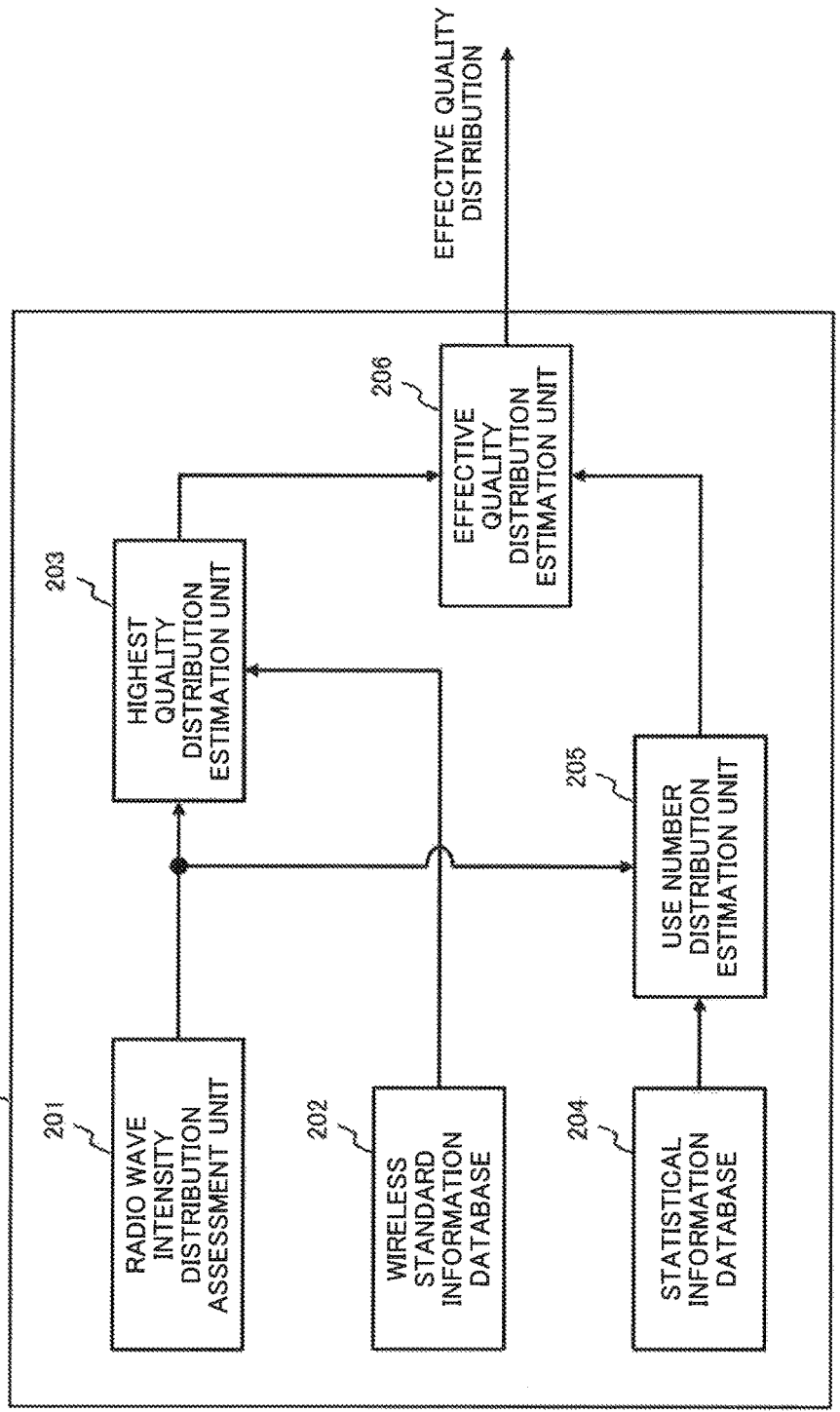
FIG. 6 is a block diagram showing a configuration of a radio wave quality distribution assessment apparatus of a fifth example embodiment of the present invention.

FIG. 6 is a block diagram showing a configuration of a radio wave quality distribution assessment apparatus of a fifth example embodiment of the present invention. The radio wave quality distribution assessment apparatus 20 of the present example embodiment includes a radio wave intensity distribution assessment unit 201, a wireless standard information database 202, a highest quality distribution estimation unit 203, a statistical information database 204, a use number distribution estimation unit 205 and an effectiveness quality distribution estimation unit 206. The radio wave intensity distribution assessment unit 201 includes a radio wave intensity distribution assessment apparatus according to the first, second or third example embodiment of the present invention. Here, the directions of arrows in FIG. 6 are illustrated as merely an example but not as the ones limiting the directions of signals between the blocks.

Here, the quality assessed by the radio wave quality distribution assessment apparatus 20 is, for example, a bit error rate or a packet error rate. Further, indices of the quality easier for users to recognize are connection easiness and a transmission speed in a communication system and image quality and sound quality in a broadcasting system. Furthermore, in a radar system, such indices are those indicating radio wave quality including a measurable range, resolution, accuracy and the like.

Figure 7:
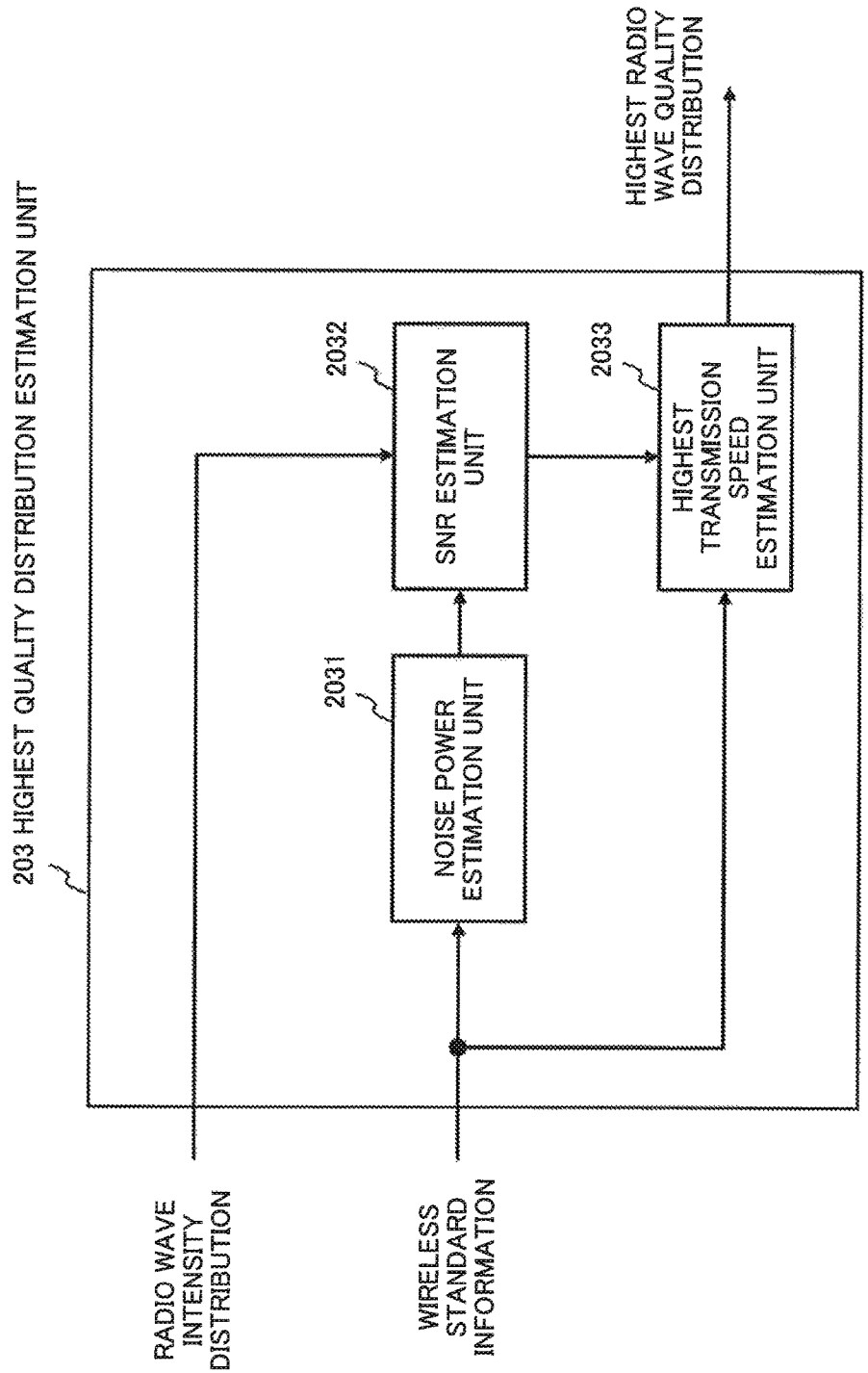
FIG. 7 is a block diagram showing a configuration of a highest quality distribution estimation unit of a fifth example embodiment of the present invention.

FIG. 7 is a diagram showing an example of a configuration of the highest quality distribution estimation unit 203. In FIG. 7, taking mobile communication as an example and a transmission speed as the quality of the radio wave, a configuration for the highest quality distribution estimation unit 203 for estimating the highest transmission speed obtained when using the radio wave exclusively is shown. The highest quality distribution estimation unit 203 includes a noise power estimation unit 2031, an SNR (Signal to Noise Ratio) estimation unit 2032 and a highest transmission speed estimation unit 2033. Here, the directions of arrows in FIG. 7 are illustrated as merely an example but not as the ones limiting the directions of signals between the blocks.

Figure 8:
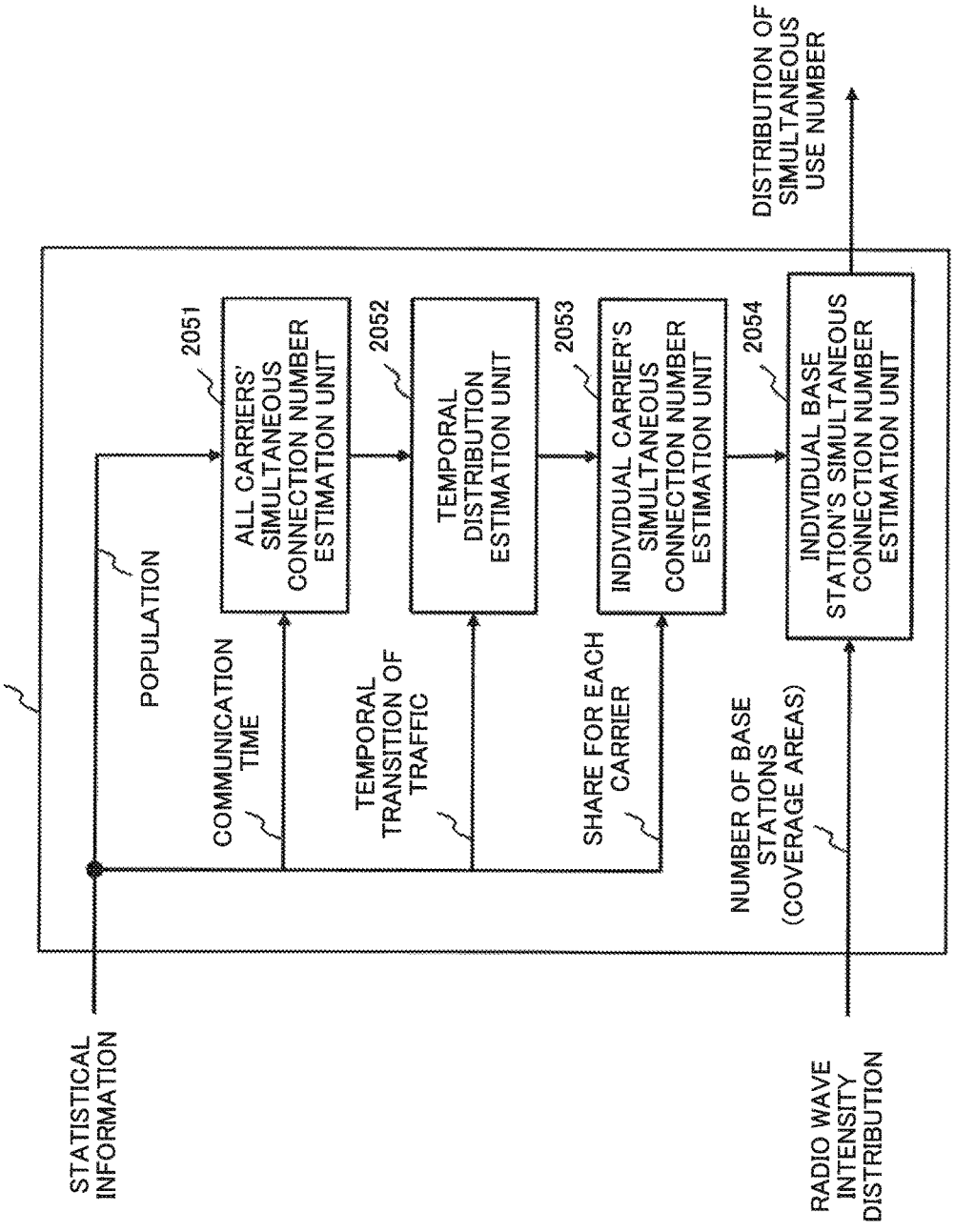
FIG. 8 is a block diagram showing an example of a configuration of a use number distribution estimation unit of the fifth example embodiment of the present invention.

FIG. 8 is a diagram showing an example of a configuration of the use number distribution estimation unit 205. In FIG. 8, a specific configuration of the use number distribution estimation unit 205 is shown, taking mobile communication as an example. The use number distribution estimation unit 205 includes an all carriers' simultaneous connection number estimation unit 2051, a temporal distribution estimation unit 2052, an individual carrier's simultaneous connection number estimation unit 2053 and an individual base station's simultaneous connection number estimation unit 2054. Here, the directions of arrows in FIG. 8 are illustrated as merely an example but not as the ones limiting the directions of signals between the blocks.

For the radio wave quality distribution assessment apparatus 20, an information processing device such as a server device may be used. The configuration of the radio wave intensity distribution assessment apparatus 20 may be implemented by using computation resources of a CPU (Central Processing Unit) of the server device and storage resources of such as a memory and an HDD (Hard Disk Drive) and thereby causing a program to run on the CPU.

For example, the units constituting the radio wave intensity distribution assessment apparatus 20 may be implemented by the computation resources of the CPU, and the databases by the storage resources of such as a memory and an HDD. The radio wave intensity distribution assessment apparatus 20 may further include a keyboard, a mouse or a touch panel to be an input unit for inputting data, a display device to be a display unit for displaying an assessment result and the like, and other components.

Details of the present example embodiment will be described below, with reference to FIGS. 6, 7 and 8.

The radio wave intensity distribution assessment unit 201 includes a radio wave intensity distribution assessment apparatus according to the first, second or third example embodiment of the present invention, and outputs a spatial distribution of radio wave intensity for a space within a designated range and frequencies within a designated range.

The Wireless standard information database 202 holds information on wireless-related standards open to the public. As a typical wireless communication standard, for wireless LAN (Local Area Network), there is IEEE (Institute of Electrical and Electronics Engineers) 802.11a/b/g/n. For wide area wireless networks called wireless MAN (Metropolitan Area Network) and wireless WAN (Wide Area Network), there are W-CDMA (Code Division Multiple Access) and CDMA 2000, which are the third generation mobile communication systems, and IEEE 802.16/WiMAX and LTE (Long Term Evolution), which are the 3.9 generation mobile communication systems, and the like.

Further, as broadcasting standards, there are DVB-T (Digital Video Broadcasting-Terrestrial), ISDB-T (Integrated Services Digital Broadcasting-Terrestrial) and the like. There also are other standards such as ARIBSTD-T85, which is a communication standard of 800 MHz band digital MCA (Multi-Channel Access Radio) systems widely used for business-use wireless systems, and ARIBSTD-T79, which is a communication standard of local government digital mobile communication systems (ARIB: Association of Radio Industries and Business).

With respect to these wireless standards, the wireless standard information database 202 holds carrier wave frequencies, bandwidths, transmission speeds, modulation methods, coding rates and the like.

From the output by the radio wave intensity distribution assessment unit 201 and with reference to the wireless standard information database 202, the highest quality distribution estimation unit 203 estimates and outputs a spatial distribution of the highest quality obtained when using a radio wave of a designated frequency exclusively.

Hereinafter, operation of the highest quality distribution estimation unit 203 will be described, with reference to FIG. 7. First, the noise power estimation unit 2031 estimates and outputs noise power included within the frequency band of a radio wave subjected to the assessment. The most simple way is to refer to information on a frequency bandwidth occupied by a signal radio wave in the wireless standard information database 202, and set thermal noise power (about −174 dBm per Hz at a room temperature of 300 K)

included within the band to be a lower limit value of noise power. This corresponds to a case of using an ideal receiver with no noise.

The SNR estimation unit 2032 calculates a ratio between a signal power assessed by the radio wave intensity distribution assessment unit 201 and the noise power estimated by the noise power estimation unit 2031, and estimates spatial distribution of the signal to noise ratio (SNR). From the standard information held by the wireless standard information database 202 and output by the SNR estimation unit 2032, the highest transmission speed estimation unit 2033 estimates and outputs a highest transmission speed as the quality of a radio wave obtained when using the radio wave exclusively. In a simple way, a theoretical limit value C of transmission speed is given by Shannon's communication capacity theorem as $C=B\times\log_2(1+SNR)$. Here, B represents a bandwidth, and $\log_2(x)$ a logarithm of x to base 2.

To estimate a more realistic value, the noise power estimation unit 2031 refers to a modulation method, a lowest reception sensitivity and a reference bit error rate, in addition to a bandwidth, in the wireless standard information database 202. From these values, a noise power demanded by the wireless standard can be estimated, and accordingly a realistic SNR value can be estimated by the SNR estimation unit 2032. Further, in usual cases, a data transmission speed itself can be referred to in the wireless standard information. In a case of a standard where adaptive modulation is performed in accordance with the condition of a radio wave transmission channel, like in current cellular phone systems, it is desirable to estimate the number of modulation levels and a coding rate from an estimated SNR value and accordingly predict a transmission speed.

While the above description has been given using a quantity referred to as SNR, a carrier wave to noise power ratio generally used for wireless communication, CNR (Carrier to Noise Ratio), may also be used. Further, not only the ratios with respect to noise power, but also a power ratio between a carrier wave and an interference wave, CIR (Carrier to Interference Ratio), may be used. Those quantities can be estimated or converted from a signal intensity distribution outputted by the radio wave intensity distribution assessment unit 201 and from a lowest reception sensitivity and interference tolerance demanded by a wireless standard. The interference wave power can be assessed by the radio wave intensity distribution assessment unit 201 as signal power in another frequency channel.

The statistical information database 204 holds statistical information on a designated area such as daytime and nighttime populations, temporal transition of mobile communication traffic, the number of communications and communication time. Such information is disclosed, for example, at a site of the Statistics Bureau of Ministry of Internal Affairs and Communications and in the information and communication statistics database, and it accordingly is possible for any person to browse the information and thereby acquire statistical data.

On the basis of the information held by the statistical information database 204, the use number distribution estimation unit 205 estimates and outputs a distribution of the number of persons or devices simultaneously using a radio wave of a designated frequency in a designated area or time slot. Hereinafter, with reference to FIG. 8, operation of the use number distribution estimation unit 205 will be described, taking mobile communication as an example and using specific values.

The all carriers' simultaneous connection number estimation unit 2051 estimates and outputs the number of simultaneous connections for all mobile communication carriers, from the population of a designated area and statistical data on a communication time period per subscriber for mobile communication. For example, according to the 2014 version of White Paper on Information and Communication in Japan publicized in the information and communication statistics database of Ministry of Internal Affairs and Communications, a communication time period per day per cellular phone/PHS subscriber is 2 minutes and 46 seconds=166 seconds (value for the 2012 fiscal year). Here, it is assumed that 5,000 persons are distributed within a designated area (this population corresponds to an approximate population covered by one macro cell base station). In that case, the number of persons simultaneously communicating by using cellular phones or PHS phones can be estimated simply to be 5,000 persons×166 seconds/(24 hours×60 minutes×60 seconds)=about 10 persons.

The temporal distribution estimation unit 2052 further estimates the number of simultaneous connections close to that in the actual state, by further taking into account temporal variation of the traffic. For example, a temporal distribution of the number of simultaneous connections is estimated by referring to mobile communication traffic in terms of each day of the week and each time slot or the like, which is similarly publicized in the information and communication statistics database. Describing it by the use of specific values, total values of mobile communication traffic (downlink) in September, 2014 are 689 Gbps per day in average and about 1000 Gbps during the time slot between 22 and 24 o'clock where the traffic is highest within one day. That is, the number of simultaneously using persons during the 2 hour period becomes 1000 Gbps/689 Gbps=1.45 times the above-mentioned estimated value, and is accordingly estimated to be about 14 persons. On the other hand, in the time slot between 4 to 6 o'clock in the morning where the traffic is lowest within one day, the traffic is about 300 Gbps, and accordingly an estimated value of the number of simultaneously using persons becomes approximately 10 persons×(300 Gbps/689 Gbps)=4.2 persons.

The individual carrier's simultaneous connection number estimation unit 2053 refers to statistical data on shares for individual mobile communication carriers in terms of the number of subscribers, and thereby estimates, among the number of simultaneous connections estimated by the temporal distribution estimation unit 2052, how many persons make connections to which communication carrier's base station. Referring to subscriber number shares for mobile communication carriers publicized by the Telecommunications Carriers Association, and accordingly assuming that a communication carrier A has a subscriber number share of 30%, the number of persons simultaneously connecting to a base station of the carrier A is estimated to be 14×0.3=4.2 persons between 22 and 24 o'clock and 4.2×0.3=1.3 persons between 4 and 6 o'clock.

The individual base station's simultaneous connection number estimation unit 2054 estimates and outputs the number of simultaneous connections in terms of each of base stations installed within and outside a designated area, with reference to the radio wave intensity distribution outputted by the radio wave intensity distribution assessment unit 201. When simply assuming that population is uniformly distributed in the space and a coverage area of each base station is constant, the number of simultaneous connections per base station is estimated to be a value obtained by dividing the above-described value (of the number of simultaneous connections) by the number of base stations. It is more desirable to refer to the radio wave intensity distribution outputted by the radio wave intensity distribution assessment unit 201, thereby to estimate coverage areas of base stations distributed on the radio wave intensity distribution, and to estimate the number of simultaneously connecting persons according to the proportions of the coverage areas and the population distribution. For example, a coverage area of a base station can be estimated by regarding, in a contour map obtained by representing intensity values in the radio wave intensity distribution as altitudes, a line being a valley as a boundary of the covering area.

Further, besides the statistical data described above, distribution of population in a designated area in terms of age and gender and other statistical information in terms of age and gender on such as the communication amount, communication time and communication purpose may be used. It enables spatially and temporally precise estimation and estimation with higher accuracy. Further, reference may be made to not only statistical data on population but also that on the number, communication amount and communication frequency of wireless sensor devices or the like expected to become in widespread use in the future. The configuration of the use number distribution estimation unit described above is merely an example, and the use number distribution estimation may be performed by means of another configuration. For example, even if the order of the all carriers' simultaneous connection number estimation unit 2051, the temporal distribution estimation unit 2052 and the individual carrier's simultaneous connection number estimation unit 2053 is changed, the same use number distribution can be estimated resultantly.

The use number distribution estimation unit 205 becomes necessary when estimating the radio wave quality of a communication system of performing communications by dividing a communication band on the frequency axis or time axis, for a plurality of users simultaneously making connections. Accordingly, the use number distribution estimation unit 205 is unnecessary, for example, for the purpose of assessing radio wave quality distribution of a terrestrial digital television transmission system, because a constant radio wave quality of terrestrial digital television broadcasting can be enjoyed at the same place regardless of the number of receivers there. Alternatively, a distribution of the number of simultaneous uses may be outputted as indicating entirely 1. Further, in the case of communications, estimating the number of simultaneously connecting persons to be 1 or less means that the radio wave can be exclusively used, and it accordingly is appropriate to set the number of simultaneously connecting persons to be 1.

From output by the highest quality distribution estimation unit 203 and output by the use number distribution estimation unit 205, the effective quality distribution estimation unit 206 estimates and outputs a distribution of radio wave quality effectively obtained when using a radio wave of a designated frequency in a designated area and time slot. In a simple way, the effective quality is obtained by dividing an estimated highest quality by the number of simultaneous uses. Hereinafter, operation of the effective quality estimation unit 206 will be described using the above-described examples of values, assuming that a designated area is covered by one macro cell base station of the communication carrier A.

It is assumed that the highest quality distribution estimation unit 203 has estimated that a highest communication speed at a certain point within the designated area is 75 Mbps for downlink (a typical value of the highest communication speed for 4G LTE downlink) when using the band exclusively. In that case, the effective communication speed in the time slot from 22 to 24 o'clock is estimated to be 75 Mbps/4.2 persons=18 Mbps, and that in the time slot from 4 to 6 o'clock to be 75 Mbps/1.2 persons=63 Mbps. Further, it is assumed that, at another point, the highest communication speed when using the band exclusively is 50 Mbps. In that case, the effective communication speed in the time slot from 22 to 24 o'clock and that in the time slot from 4 to 6 o'clock, at the position, are estimated to be 50 Mbps/4.2 persons=12 Mbps and 50 Mbps/1.2 persons=42 Mbps, respectively. In that way, spatial and temporal distribution of radio wave quality within a designated range can be estimated.

While the operation for estimating distribution of radio wave quality based on public information has been described above, actual radio wave intensity measurement and reference to the measurement data may be performed similarly to the radio wave intensity distribution assessment apparatus 11 of the third example embodiment. Particularly, when the actual radio wave intensity measurement in a designated area can be performed by means of a cellular phone or a TV tuner, it is preferable to collect the measurement data and hold it as a database. Thereby, it becomes possible to estimate a radio wave quality closer to that in the actual state.

While the operation of assessing distribution of radio wave quality using current statistical data has been described above taking mobile communication as an example, it is also possible to estimate past distribution of radio wave quality by using past statistical data. It is further possible to predict radio wave quality in the future, by assuming that the recent tendency in statistical data on population, communication traffic and the like continues even in the future.

While the above description has been given particularly in detail in relation to cellular phone systems with a significant number of opportunities for users to use, it is also possible to assess whether the nation's living areas are covered with no blind zone by radio wave systems to play an important role in case of disaster and emergency, such as firefighting radio and disaster prevention radio. Further, the assessment of distribution of radio wave quality can be performed not only on communications and broadcasting but also on a radar system such as an airport surveillance radar and a weather radar.

As has been described above, according to the present example embodiment, it is possible to provide a radio wave quality distribution widely covering areas and frequencies, on the basis of public information. For example, it is possible for a user to know a radio wave of what frequency is distributed with what intensity in the area and building the user lives or intends to live, and accordingly to assess the usability objectively. It is further possible to objectively assess a radio wave for what use is available with what quality in urban, suburb and rural areas and the like, and it accordingly is possible to determine whether the nation is fairly enjoying the values provided by radio waves which are public property.

According to the present example embodiment, assessment of a radio wave intensity distribution widely covering areas and frequencies becomes possible, and it thereby becomes possible to assess a distribution, widely covering areas and frequencies, of the quality of a communication function provided by a radio wave.

The present invention is not limited to the above-described example embodiments, but various modifications may be made within the scope of the present invention described as claims, and such modifications shall be encompassed within the scope of the present invention.

Part or the whole of the above-described example embodiments can be described as, but are not limited to, the following supplementary notes.

(Supplementary Note 1)

A radio wave intensity distribution assessment apparatus comprising:

a radio wave station position detection unit for detecting a position of a radio wave station, on the basis of a geographic image having position information and of an image of the radio wave station;

a radio wave station information integration unit for outputting radio wave station information based on the position of the radio wave station and on radio wave station license information on the radio wave station; and a radio wave intensity distribution estimation unit for estimating and outputting a radio wave intensity distribution in a designated range, on the basis of the radio wave station information and topographical information on the surroundings of the radio wave station.

(Supplementary Note 2)

The radio wave intensity distribution assessment apparatus according to supplementary note 1, comprising at least one of:

a geographic image database for holding and providing the geographic image;

a radio wave station image database for holding and providing the image of a radio wave station;

a radio wave station license information database for holding and providing the radio wave station license information; and a topographical information database for holding and providing the topographical information.

(Supplementary Note 3)

The radio wave intensity distribution assessment apparatus according to supplementary note 1 or 2, wherein the radio wave station position detection unit comprises:

a feature extraction unit for extracting a feature of the geographic image;

a feature extraction unit for extracting a feature of the image of a radio wave station; and an identification unit for comparing the features with each other and thereby identifying the radio wave station in the geographic image.

(Supplementary Note 4)

The radio wave intensity distribution assessment apparatus according to any one of supplementary notes 1 to 3, comprising a radio wave measurement information database for holding and providing radio wave measurement information acquired by actually measuring a radio wave around the radio wave station, wherein at least one of the radio wave station information integration unit and the radio wave intensity distribution estimation unit uses the radio wave measurement information in performing their respective processes.

(Supplementary Note 5)

The radio wave intensity distribution assessment apparatus according to any one of supplementary notes 1 to 4, wherein the image of a radio wave station is tagged with attributes including frequency band, output power and usage.

(Supplementary Note 6)

The radio wave intensity distribution assessment apparatus according to any one of supplementary notes 1 to 5, wherein the radio wave station license information includes license information data registered at the time of the radio wave station's opening.

(Supplementary Note 7)

The radio wave intensity distribution assessment apparatus according to any one of supplementary notes 1 to 6, wherein the topographical information includes topography, geological features and buildings' positions, heights, structures and materials within a designated space.

(Supplementary Note 8)

The radio wave intensity distribution assessment apparatus according to any one of supplementary notes 1 to 7, wherein the geographic image, the image of a radio wave station, the radio wave station license information and the topographical information include public information.

(Supplementary Note 9)

A radio wave quality distribution assessment apparatus comprising:

a radio wave intensity distribution assessment unit including the radio wave intensity distribution assessment apparatus according to any one of supplementary notes 1 to 8;

a highest quality distribution estimation unit for estimating and outputting a distribution of highest quality obtained when using a radio wave exclusively, on the basis of the radio wave intensity distribution and wireless standard information on the radio wave;

a use number distribution estimation unit for estimating a distribution of the number of simultaneous uses of the radio wave, on the basis of statistical information; and an effective quality distribution estimation unit for estimating and outputting a distribution of effective quality provided for users of the radio wave, on the basis of the distribution of highest quality and the distribution of the number of simultaneous uses.

(Supplementary Note 10)

The radio wave quality distribution assessment apparatus according to supplementary note 9, comprising:

a wireless standard information database for holding and providing the wireless standard information; and a statistical information database for holding and providing the statistical information.

(Supplementary Note 11)

The radio wave quality distribution assessment apparatus according to supplementary note 9 or 10, wherein the use number distribution estimation unit estimates a distribution of the number of simultaneous uses of the radio wave, on the basis of the statistical information and base station information held by the radio wave intensity distribution.

(Supplementary Note 12)

The radio wave quality distribution assessment apparatus according to supplementary note 11, wherein the base station information includes a base station distribution, the number of base stations or base stations' coverage areas in the radio wave intensity distribution.

(Supplementary Note 13)

The radio wave quality distribution assessment apparatus according to any one of supplementary notes 9 to 12, wherein the distribution of effective quality is a spatial or temporal distribution.

(Supplementary Note 14)

A radio wave intensity distribution assessment method comprising:

detecting a position of a radio wave station, on the basis of a geographic image having position information and of an image of the radio wave station;

outputting radio wave station information based on the position of the radio wave station and on radio wave station license information on the radio wave station; and estimating and outputting a radio wave intensity distribution in a designated range, on the basis of the radio wave station information and topographical information on the surroundings of the radio wave station.

(Supplementary Note 15)

The radio wave intensity distribution assessment method according to supplementary note 14, wherein the detection of position information on the radio wave station comprises: extracting a feature of each of the geographic image and the image of a radio wave station; and comparing the features with each other and thereby identifying the radio wave station in the geographic image.

(Supplementary Note 16)

The radio wave intensity distribution assessment method according to supplementary note 14 or 15, comprising by using radio wave measurement information obtained by measuring a radio wave around the radio wave station, performing integration of the radio wave station information or estimation of the radio wave intensity distribution.

(Supplementary Note 17)

The radio wave intensity distribution assessment method according to any one of supplementary notes 14 to 16, wherein the image of a radio wave station is tagged with attributes including frequency band, output power and usage.

(Supplementary Note 18)

The radio wave intensity distribution assessment method according to any one of supplementary notes 14 to 17, wherein the radio wave station license information includes license information data registered at the time of the radio wave station's opening.

(Supplementary Note 19)

The radio wave intensity distribution assessment method according to any one of supplementary notes 14 to 18, wherein the topographical information includes topography, geological features and buildings' positions, heights, structures and materials within a designated space.

(Supplementary Note 20)

The radio wave intensity distribution assessment method according to any one of supplementary notes 14 to 19, wherein the geographic image, the image of a radio wave station, the radio wave station license information and the topographical information include public information.

(Supplementary Note 21)

A radio wave quality distribution assessment method comprising:

estimating a radio wave intensity distribution by the radio wave intensity distribution assessment method according to any one of supplementary notes 14 to 20;

estimating a distribution of highest quality obtained when using a radio wave exclusively, on the basis of the radio wave intensity distribution and wireless standard information on the radio wave;

estimating a distribution of the number of simultaneous uses of the radio wave, on the basis of statistical information; and estimating a distribution of effective quality provided for users of the radio wave, on the basis of the distribution of highest quality and the distribution of the number of simultaneous uses.

(Supplementary Note 22)

The radio wave quality distribution assessment method according to supplementary note 21, wherein the estimation of a distribution of the number of simultaneous uses of the radio wave is performed on the basis of the statistical information and base station information held by the radio wave intensity distribution.

(Supplementary Note 23)

The radio wave quality distribution assessment method according to supplementary note 22, wherein the base station information includes a base station distribution, the number of base stations or base stations' coverage areas in the radio wave intensity distribution.

(Supplementary Note 24)

The radio wave quality distribution assessment method according to any one of supplementary notes 21 to 23, wherein the distribution of effective quality is a spatial or temporal distribution.

This application is based upon and claims the benefit of priority from Japanese Patent Application No. 2015-026127 filed on Feb, 13, 2015, the disclosure which is incorporated herein in its entirety by reference.

INDUSTRIAL APPLICABILITY

The present invention can be used in fields of such as television broadcasting, mobile communications and radars where radio waves are used.

REFERENCE SIGNS LIST 1 radio wave intensity distribution assessment apparatus
2 radio wave station position detection unit
3 radio wave station information integration unit
4 radio wave intensity distribution estimation unit
5 radio wave quality distribution assessment apparatus
6 radio wave intensity distribution assessment unit
7 highest quality distribution estimation unit
8 use number distribution estimation unit
9 effective quality distribution estimation unit
10, 11 radio wave intensity distribution assessment apparatus
101 geographic image database
102 learning radio wave station image database
103 radio wave station position detection unit
104 radio wave station license information database
105 radio wave station information integration unit
106 topographical information database
107 radio wave intensity distribution estimation unit
108 radio wave measurement information database
1031 image acquisition unit
1032, 1033 feature extraction unit
1034 radio wave station model database
1035 identification unit
1036 position acquisition unit
20 radio wave quality distribution assessment apparatus
201 radio wave intensity distribution assessment unit
202 wireless standard information database
203 highest quality distribution estimation unit
204 statistical information database
205 use number distribution estimation unit
206 effective quality distribution estimation unit 2031 noise power estimation unit
2032 SNR estimation unit
2033 highest transmission speed estimation unit
2051 all carriers' simultaneous connection number estimation unit
2052 temporal distribution estimation unit
2053 individual carrier's simultaneous connection number estimation unit
2054 individual base station's simultaneous connection number estimation unit

What is claimed is:

1. A radio wave intensity distribution assessment apparatus comprising:
    a radio wave station position detection circuit for detecting a position of a radio wave station, on the basis of a geographic image having position information and of an image of the radio wave station;
    a radio wave station information integration circuit for outputting radio wave station information based on the position of the radio wave station and on radio wave station license information on the radio wave station; and
    a radio wave intensity distribution estimation circuit for estimating and outputting a radio wave intensity distribution in a designated range, on the basis of the radio wave station information and topographical information on the surroundings of the radio wave station.

2. The radio wave intensity distribution assessment apparatus according to claim 1, comprising at least one of:
    a geographic image database for holding and providing the geographic image;
    a radio wave station image database for holding and providing the image of a radio wave station;
    a radio wave station license information database for holding and providing the radio wave station license information; and
    a topographical information database for holding and providing the topographical information.

3. The radio wave intensity distribution assessment apparatus according to claim 1, wherein
    the radio wave station position detection circuit comprises:
    a feature extraction circuit for extracting a feature of the geographic image;
    a feature extraction circuit for extracting a feature of the image of a radio wave station; and
    an identification circuit for comparing the features with each other and thereby identifying the radio wave station in the geographic image.

4. The radio wave intensity distribution assessment apparatus according to claim 1, comprising
    a radio wave measurement information database for holding and providing radio wave measurement information acquired by actually measuring a radio wave around the radio wave station, wherein
    at least one of the radio wave station information integration circuit and the radio wave intensity distribution estimation circuit uses the radio wave measurement information in performing their respective processes.

5. A radio wave quality distribution assessment apparatus comprising:
    a radio wave intensity distribution assessment circuit including the radio wave intensity distribution assessment apparatus according to claim 1;
    a highest quality distribution estimation circuit for estimating and outputting a distribution of highest quality obtained when using a radio wave exclusively, on the basis of the radio wave intensity distribution and wireless standard information on the radio wave;
    a use number distribution estimation circuit for estimating a distribution of the number of simultaneous uses of the radio wave, on the basis of statistical information; and
    an effective quality distribution estimation circuit for estimating and outputting a distribution of effective quality provided for users of the radio wave, on the basis of the distribution of highest quality and the distribution of the number of simultaneous uses.

6. The radio wave quality distribution assessment apparatus according to claim 5, comprising:
    a wireless standard information database for holding and providing the wireless standard information; and
    a statistical information database for holding and providing the statistical information.

7. The radio wave quality distribution assessment apparatus according to claim 5, wherein
    the use number distribution estimation circuit estimates a distribution of the number of simultaneous uses of the radio wave, on the basis of the statistical information and base station information held by the radio wave intensity distribution.

8. A radio wave intensity distribution assessment method comprising:
    detecting a position of a radio wave station, on the basis of a geographic image having position information and of an image of the radio wave station;
    outputting radio wave station information based on the position of the radio wave station and on radio wave station license information on the radio wave station; and
    estimating and outputting a radio wave intensity distribution in a designated range, on the basis of the radio wave station information and topographical information on the surroundings of the radio wave station.

9. The radio wave intensity distribution assessment method according to claim 8, wherein
    the detection of position information on the radio wave station comprises: extracting a feature of each of the geographic image and the image of a radio wave station; and comparing the features with each other and thereby identifying the radio wave station in the geographic image.

10. A radio wave quality distribution assessment method comprising:
    estimating a radio wave intensity distribution by the radio wave intensity distribution assessment method according to claim 8;
    estimating a distribution of highest quality obtained when using a radio wave exclusively, on the basis of the radio wave intensity distribution and wireless standard information on the radio wave;
    estimating a distribution of the number of simultaneous uses of the radio wave, on the basis of statistical information; and
    estimating a distribution of effective quality provided for users of the radio wave, on the basis of the distribution of highest quality and the distribution of the number of simultaneous uses.

* * * * *